United States Patent [19]

Metzger et al.

[11] 3,860,695

[45] Jan. 14, 1975

[54] PROCESS FOR THE MANUFACTURE OF SODIUM PYROSULFITE

[75] Inventors: Adolf Metzger, Wiesbaden; Jörg Scholderer, Frankfurt am Main; Horst Schreiber, Kelkheim, Taunus, all of Germany

[73] Assignee: Farbwerke Hoechst Aktiengesellschaft vormals Meister Lucius & Bruning, Frankfurt am Main, Germany

[22] Filed: Apr. 24, 1973

[21] Appl. No.: 354,116

[30] Foreign Application Priority Data
Apr. 29, 1972 Germany............................ 2221298

[52] U.S. Cl. ............................................... 423/519
[51] Int. Cl. ............................................. C01d 5/14
[58] Field of Search..................... 423/512, 519, 242

[56] References Cited
UNITED STATES PATENTS

| 3,361,524 | 1/1968 | Spormann et al................... 423/512 |
| 3,369,866 | 2/1968 | Spormann et al................... 423/519 |
| 3,653,812 | 4/1972 | Schneider et al................... 423/242 |

*Primary Examiner*—Earl C. Thomas
*Attorney, Agent, or Firm*—Curtis, Morris and Safford

[57] ABSTRACT

A flue gas containing from 6 to 20 volume percent of sulfur dioxide is passed through a jet scrubber the outlet orifice of which is submerged in the reaction mixture containing $SO_2$ and sodium hydroxide solution. The gas-free saturated sodium hydrogen sulfite solution and the sodium pyrosulfite containing reaction mixture are pump-circulated; the pH being maintained in a range of from 4 to 5 by adding sodium hydroxide or sodium carbonate.

5 Claims, 1 Drawing Figure

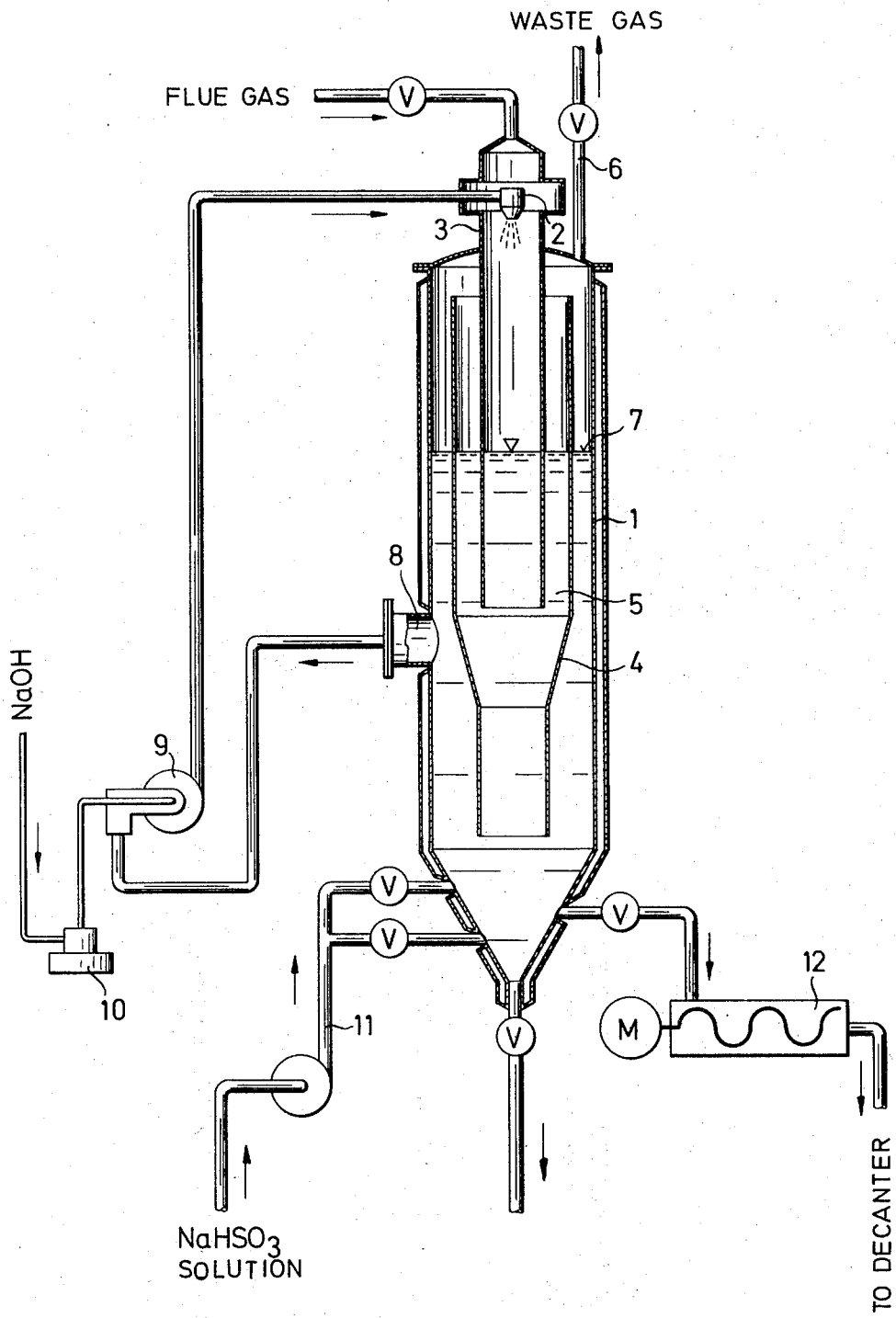

PROCESS FOR THE MANUFACTURE OF SODIUM PYROSULFITE

The present invention relates to a process for the continuous manufacture of crystalline sodium pyrosulfite by feeding sulfur dioxide containing gases into weakly acidic reaction mixtures.

It is known to manufacture sodium pyrosulfite by feeding sulfur dioxide or sulfur dioxide containing gases into aqueous alkaline solutions of sodium hydroxide or sodium carbonate. The crystalline sodium pyrosulfites obtained in this process are separated from the mother liquor by filtration and subsequently dried. Optionally, further sodium pyrosulfite may be obtained from the mother liquor by gentle evaporation.

In another known manufacturing process, sodium carbonate or sodium hydroxide is introduced into concentrated sodium bisulfite solution, whereby an excess of about 3 percent of sodium carbonate or of from 9 to 10 percent of sodium hydroxide is formed. The suspension so obtained is passed through a submerged absorber cascade, through which $SO_2$ containing gas is passed simultaneously in a counter-current. The throughput quantities are controlled in such a manner that in the first absorber the solution remains alkaline, which ensures the obtention of waste gas free from $SO_2$. The finished sodium pyrosulfite suspension is discharged from the last absorber and fed in the centrifuge. This process, however, requires a relatively large apparatus volume and thus gives only low space-time yields. The solid material in the first absorber consists of sodium sulfite, which has to be converted to sodium pyrosulfite in the subsequent absorbers becoming gradually more acidic. This mode of operation results in an inclusion of sodium sulfite, since $SO_2$ has to be transmitted to the sulfite ions through the sodium pyrosulfite envelope which is formed first, and this impeded transport of $SO_2$ is very slow.

Higher yields are obtained by separately gassing the different absorbers, but this requires a separate processing of the $SO_2$ containing waste gas. By establishing a gradient of pH values in the different absorbers, the conversion of sodium sulfite to sodium pyrosulfite may be substantially accelerated. This can be effected by maintaining the first absorber in a weakly acidic state. By correspondingly distributing the feed of sodium hydroxide or sodium carbonate solution, the formation of local zones of higher pH values may be limited. These measures may substantially increase the space-time-yield; however, the process as a whole still suffers from the abovementioned fundamental disadvantages. A special disadvantage of this process resides in the fact that important apparatus parts are choked by incrusted crystalline products. Thus, the formation of sodium sulfite, which has a poorer solubility than the sodium pyrosulfite desired, cannot be excluded when local concentration variations occur in the course of the mixing and feeding of the reactants. Such sodium sulfite formation causes choking of inlet orifices, tubes and valves, which necessitates frequent rinsing of the plant equipment. The water which thus must be fed in redissolves part of the precipitated pyrosulfite, so that the yield of salt is substantially decreased. This difficulty may be partially overcome by operating at low salt concentrations, but this, in turn, reduces the profitability of the process.

A further process is known, in which sodium bisulfite solution running in a cyclic system is gassed batchwise with $SO_2$ containing flue gas in a foam column after addition of the necessary amount of sodium carbonate. For the conversion of the sodium carbonate solution to bisulfite solution, about 8 hours are required, and the supersaturation of the solution takes another 8 hours. After the supersaturation of the solution, the pyrosulfite is crystallized in a crystallizer. The pyrosulfite so obtained contains an average of from 63 to 65 percent of $SO_2$ (theoretical yield 67.3 percent). Variations of the $SO_2$ content up to a maximum of 66.7 percent prove that the process is not completely controlled and no uniform product is obtained. Further disadvantages of this process are the discontinuous operation mode, the relatively low $SO_2$ content of the salt obtained and the low space-time-yield in the foam column.

German Pat. No. 1,186,450 describes a two-step process, in which in the first step sodium bisulfite is prepared from $SO_2$ and sodium hydroxide solution, and in the subsequent second step, sodium sulfite is obtained using further NaOH and the waste gases of the first step. The mother liquor of the second step may be recycled into the first or the second step operation.

A process has now been found for the continuous manufacture of crystallized sodium pyrosulfite, which avoids the aforementioned disadvantages and, under exactly defined conditions, allows the preparation of salts of different quality. This process comprises contacting a flue gas having a sulfur dioxide content of from 6 to 20 percent with the mother liquor in a Venturi scrubber, feeding the gas into the reactor by means of the Venturi tube submerged in the reaction mixture, separating the crystallized sodium pyrosulfite from the reaction mixture, pump-circulating the gas-free reaction mixture, and adding a sodium hydroxide or sodium carbonate solution while maintaining a pH of from 4.0 to 5.0.

For the manufacture of a crystallized sodium pyrosulfite having a low sulfite content, the process of the invention may be carried out as follows: The flue gas used as reaction gas has a sulfur dioxide content of from 6 to 20 percent, preferably from 8 to 18 percent, and is contacted with a pump-circulated reaction solution by means of a mixing tube the lower end of which is submerged in the reaction mixture in a reaction vessel. The reaction solution is saturated with sodium hydrogen sulfite and has a pH of from 4 to 5.0, preferably from 4.4 to 4.9. The lower end of the reaction vessel is of conic shape and has an orifice for the discharge of the crystalline product precipitated from the reaction mixture. Because of the mixing tube being submerged in the reaction mixture, the gas causes thorough agitation, which maintains the particles in suspension for a long period, thus favorably influencing the growth of crystals and obtaining a further absorption of the sulfur dioxide from the flue gas. The residual gas, when leaving the reaction vessel at a temperature of 60°C, contains from 2.5 to 6 percent of sulfur dioxide. This valuable, sulfur dioxide containing waste gas is generally processed to sodium hydrogen sulfite or sodium sulfite in a separate apparatus or plant. Part of this hydrogen sulfite is required for the feeding of the reactor, since, depending on the $SO_2$ concentration of the gas employed, more or less water is discharged together with the residual gas. The water evaporated is replaced by bisulfite solution containing about 40 percent of $NaHSO_3$. A cylindrical insert in the reactor separates the gassed inner space from the gas-free outer space, from which the mother liquor is removed in order to be circulated by means of the jet pump.

The gas-free reaction mixture, in which also part of the crystallized product is suspended, is pump-circulated at high speed, so that the pH variations, causes also by the NaOH addition to the reaction mixture, do not exceed 0.6 pH units. In order to maintain a pH of from 4.0 to 5.0, preferably from 4.4 to 4.9, either a 40 to 70 percent, preferably 45 to 55 percent by weight NaOH solution, or a 50 to 70 percent, preferably 60 to 70 percent by weight $Na_2CO_3$ suspension is added. In order to avoid great pH variations, the addition is preferably carried out at one determined place of high velocity of flow and turbulence. Therefore, the addition of the sodium hydroxide or sodium carbonate solution is preferably carried out in the immediate vicinity of the pump required for the circulation of the reaction mixture.

The process of the invention is carried out at a temperature not lower than 5°C, generally from 10°C to 105°C, preferably from 40°C to 75°C.

According to the process of the invention, a crystalline sodium pyrosulfite having a maximum content of from 0.2 to 0.3 percent of sodium sulfite is obtained when the reaction mixture does not exceed a pH of 4.9. A product having an especially low content of sulfite (below 0.1 percent) is obtained when the reaction mixture does not exceed a pH of 4.8. Furthermore, the present process for the manufacture of crystalline sodium pyrosulfite provides the following advantages:

The process is continuous, compact, rapidly adaptable to varying gas qualities and easy to optimize, and it permits the attainment of a high space-time-yield. A regular rinsing of equipment in order to eliminate incrustations is not necessary. The addition of materials may be automated. A special advantage resides in the fact that the process may be carried out using a low amount of solvent which is circulated (suspended product does not adversely affect the course of the process). The particle size distribution of the sodium pyrosulfite obtained is uniform. Powder and dust portions are small, since the portion of the product having fine particles remains suspended in the reaction solution and is forwarded again to the reaction zone by pump-circulation, in which zone the particles grow to form larger crystals.

This invention will be further understood by means of the FIGURE, which represents a specific embodiment of the process.

Referring to the FIGURE, it shows an apparatus which comprises a cylindrical reactor 1 having a conical bottom. The flue gas is fed into the Venturi scrubber consisting of nozzle 2 and mixing tube 3. The cylindrical insert 4 is used for the separation of gas and liquid. The gas, coming from mixing tube 3, enters intermediate space 5 and leaves the reactor via waste gas exhaust 6. The reactor is charged up to level 7. The mother liquor or the salt pulp to be pump-circulated is discharged from the reactor via pipe 8 and transmitted to nozzle 2 under the necessary pressure via circulation pump 9. By means of pump 10, the necessary sodium hydroxide is pumped to circulation pump 9 and there added to the circulating liquor. The mother liquor introduced into the reactor cone via feed pipe 11 provides the necessary flow of the pulp and, in addition, causes a classification of the crystals contained in the salt pulp. The salt pulp is discharged from the reactor by means of pump 12 and forwarded to the centrifuge for the separation of mother liquor and salt. It is possible to return the greater part of the mother liquor to the reactor; though a certain amount has to be excluded in order to remove the impurities formed which, however, may be replaced by bisulfite solution.

The specific embodiment as shown in the FIGURE is only one of the numerous embodiments of the process of the invention.

The following examples illustrate the invention.

EXAMPLE 1

1350 $Nm^3$ (N = measured at 20°C and 760 mm Hg) per hour of flue gas containing 10.8 percent by volume of $SO_2$ is fed into the reactor. A mother liquor in an amount of 150 $m^3/h$ is circulated via the Venturi scrubber. The Venturi tube is submerged in the reaction solution to a depth corresponding to about 1,800 mm Hg. The pH, measured at 60°C, is adjusted to 4.6 to 4.65 in the pump-circulated mother liquor, and 240 l/h of 50 percent by weight sodium hydroxide solution is added to the mother liquor. About 1,200 kg per hour of mother liquor are introduced into the reactor cone. Under these conditions, 370 kg/h of dried pyrosulfite are obtained. The $SO_2$ content of the waste gas is 3.7 percent.

EXAMPLE 2

1,600 $Nm^3/h$ of gas containing 7.6 percent by volume of $SO_2$ are used, and under the same conditions as described in Example 1, 169 l/h of 50 percent by weight NaOH are added. The yield of sodium pyrosulfite is 253 kg/h, and the $SO_2$ content in the waste gas about 3 percent by volume. Under these conditions, a sodium pyrosulfite nearly free from sodium sulfite is obtained.

What is claimed is:

1. A process for the continuous manufacture of crystalline sodium pyrosulfite which comprises establishing a body of an aqueous reaction medium that is substantially saturated in respect to sodium hydrogen sulfite and has a pH of from 4 to 5, continuously removing a stream of said reaction medium from said body and mixing it in a jet scrubber with a flue gas stream containing 6 percent to 20 percent by volume of sulfur dioxide, introducing the resulting mixture into said body of reaction medium to cause sodium pyrosulfite crystals to precipitate therefrom, separating said crystals from the reaction medium and returning the mother liquor to said body of reaction medium, and adding a sodium hydroxide or sodium carbonate solution to the recirculated stream of reaction medium at such a rate as to maintain the pH thereof between 4 and 5.

2. A process as claimed in claim 1, which comprises carrying out the reaction at a temperature of from 10° to 105°C.

3. A process as claimed in claim 1, which comprises carrying out the reaction at a temperature of from 40° to 75°C.

4. A process as claimed in claim 1, which comprises maintaining the recirculated reaction mixture in a pH range of from 4.4 to 5.0 by adding a 50 percent by weight sodium hydroxide solution.

5. A process according to claim 1 wherein aqueous sodium hydrogen sulfite is added to said body of reaction medium at a rate to compensate for water carried off by the spent flue gas after passing through said reaction medium.

* * * * *